United States Patent [19]

Scott

[11] Patent Number: 4,524,386

[45] Date of Patent: Jun. 18, 1985

[54] THERMAL TARGET DISPLAY SYSTEM

[75] Inventor: Edward A. Scott, Laurel, Md.

[73] Assignee: The United States of America as represented by the Secretary of the Army, Washington, D.C.

[21] Appl. No.: 367,306

[22] Filed: Apr. 12, 1982

[51] Int. Cl.³ .................................................. H04M 5/16
[52] U.S. Cl. ....................................... 358/113; 358/104
[58] Field of Search ............... 358/113, 104, 241, 110; 364/521; 340/786, 756; 357/50, 56, 45, 49; 250/253, 342, 347, 332

[56] References Cited

U.S. PATENT DOCUMENTS

| | | | |
|---|---|---|---|
| 3,410,999 | 11/1968 | Fergason et al. | 340/786 |
| 3,452,199 | 6/1969 | Stahlhut | 340/786 |
| 3,698,012 | 10/1972 | Ensminger et al. | 340/786 |
| 3,718,757 | 2/1973 | Gulitz et al. | 358/113 |
| 3,868,508 | 2/1975 | Lloyd | 250/330 |
| 3,877,008 | 4/1975 | Payne | 340/786 |
| 3,895,182 | 7/1975 | Trilling | 358/113 |
| 4,209,832 | 6/1980 | Gilham | 364/521 |
| 4,220,972 | 9/1980 | Geokezas | 358/166 |
| 4,246,605 | 1/1981 | La Russa | 358/104 |
| 4,298,887 | 11/1981 | Rode | 358/113 |
| 4,400,729 | 8/1983 | Jones | 358/113 |
| 4,403,251 | 9/1983 | Domarenok et al. | 358/113 |

OTHER PUBLICATIONS

Scott, Edward A., "Infrared Target Array Development", TECOM Project No. 5-CO-YPO-ITA-811, Report No. 397, USP Army Yuma Proving Ground, Yuma, Arizona, Apr. 1980, pp. 19–22.

Primary Examiner—John C. Martin
Assistant Examiner—Edward L. Coles
Attorney, Agent, or Firm—Robert P. Gibson; Anthony T. Lane; Saul Elbaum

[57] ABSTRACT

A thermal target display system and method is disclosed by which thermal radiation patterns simulating the thermal "signature" of selected "real-scene" objects such as vehicles, buidings, and personnel, can be readily generated. The system utilizes a plurality of individually controlled, active heat-radiating thermal elements disposed in an array to form a thermal screen or target. The thermal screen is interfaced with a video system and is energized in response to a video image representing the real-scene object in the infrared spectrum. In the preferred embodiment, the gray scale representations of the individual video image pixels are converted into signals which define desired temperature differentials of each of the individual radiating elements of the thermal screen or target, these signals controlling the energization of the thermal elements so that the thermal screen generates a radiation pattern which corresponds to a particular video frame. The thermal radiation pattern, representative of the thermal signature of the real-scene object, can be enhanced and manipulated through conventional video processing techniques.

9 Claims, 2 Drawing Figures

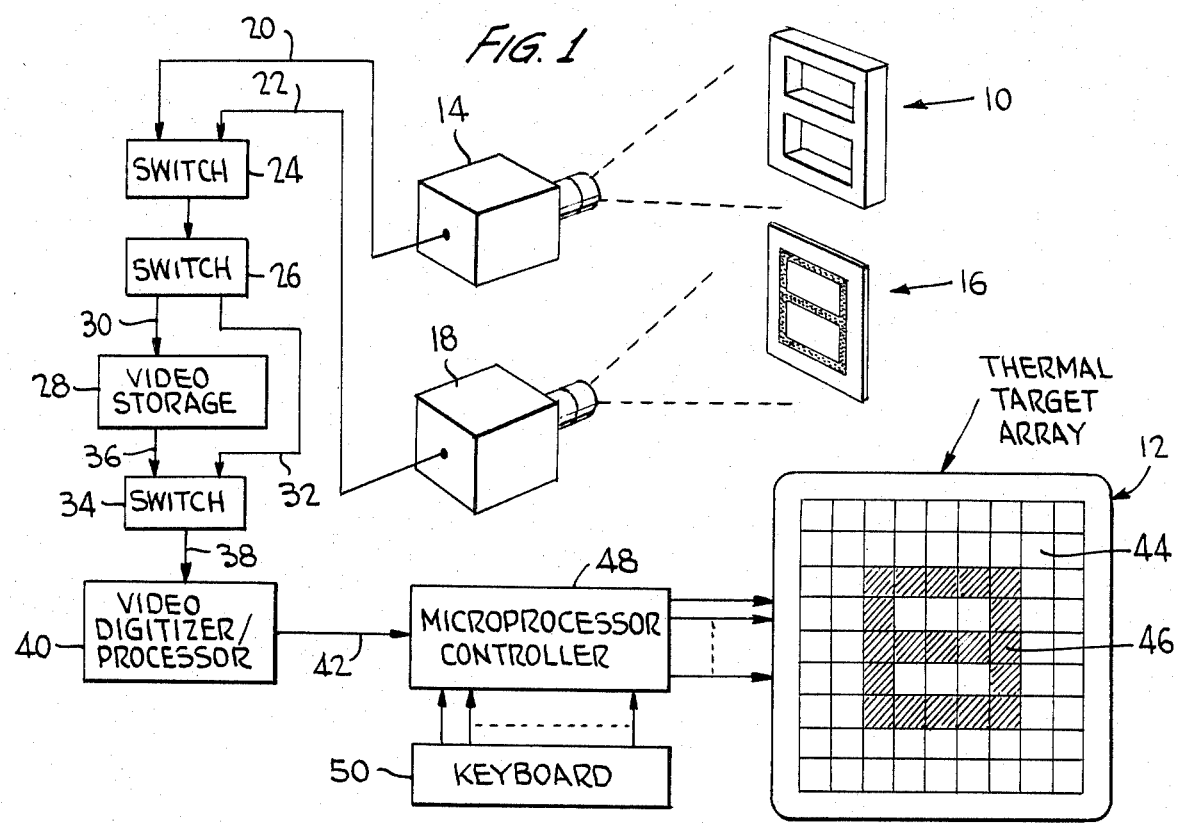
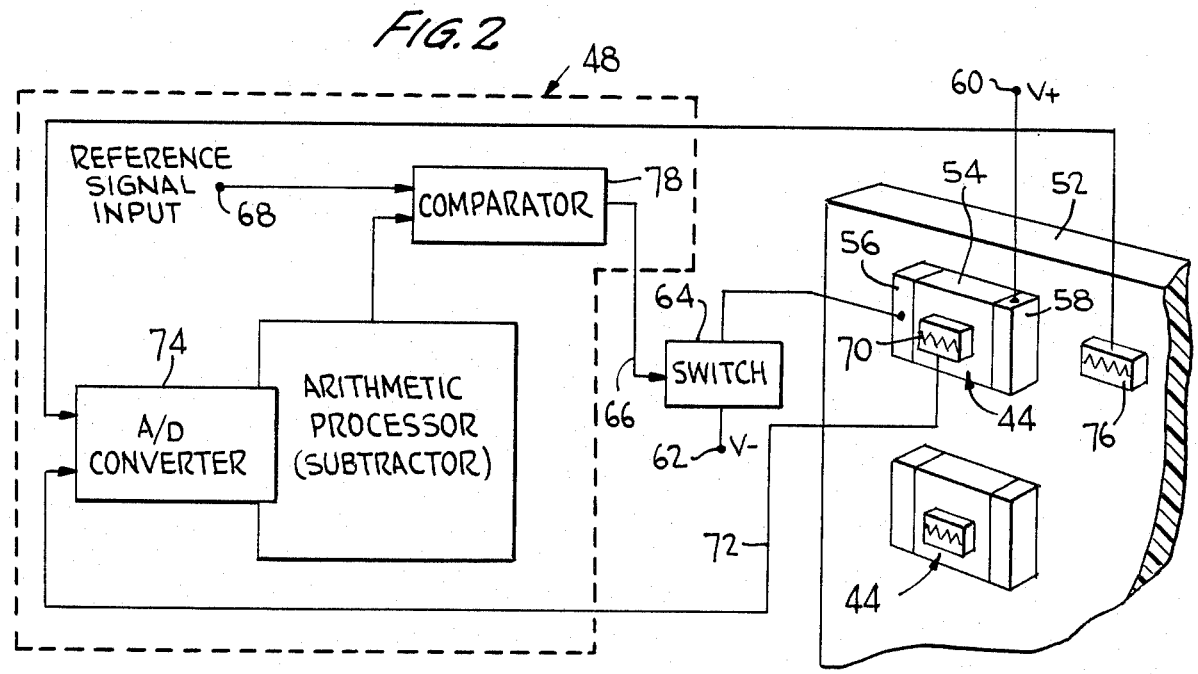

THERMAL TARGET DISPLAY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention generally relates to thermal display systems and particularly relates to thermal target display systems for generating thermal radiation patterns simulating infrared signatures of selected target objects.

In the development, testing and evaluation of so-called night vision or thermal imaging sights, such as might form part of a military target acquisition and fire control system, a necessity exists for the provision of a target which displays thermal "signatures" in order to quantitatively and qualitatively assess the performance of the device under test. Such thermal signatures comprise the thermal or infrared radiation patterns of "real-scene" objects such as vehicles, buildings or personnel which the nightvision or thermal imaging sights were designed to detect. Obviously, such nightvision or thermal sighting devices could be tested utilizing the real-scene objects themselves as targets but oftentimes this proves to be too costly and impractical.

It is for this reason that efforts have been made towards the development of test targets which generate thermal radiation patterns simulating the thermal signature of the "real scene" object. For example, thermal test targets have been produced containing a plurality of thermal radiating bars comprised of elements which serve to provide a crude thermal radiation "test" pattern. The thermal radiating patterns of such prior target devices, however, were generally fixed and, as such, separate devices had to be provided for each thermal image to be produced. While these prior devices constituted an improvement over the use of real-scene objects per se in the testing of night vision devices, these fixed-pattern or fixed-display devices still possessed significant short-comings primarily stemming from their inability to provide a dynamically-changing and realistic display. If such a realistic and dynamically changing or variable display could be provided, the requirement for multiple "single-scene" targets would be eliminated and the night vision sight testing process itself would be improved in that the operator of a nightvision device would never know in advance just what thermal object pattern image might be generated on any particular test pass. Objectivity in the field of testing night vision devices would thereby be restored.

BRIEF SUMMARY OF THE INVENTION

It is thus apparent that a need exists in this art for the provision of a thermal target display system which is capable, upon selection by an operator, of displaying a realistic thermal radiation image or signature of any of a plurality of different targets or real-scene objects. It is the primary objective of the instant invention to provide such a thermal display system and method for generating the required appropriate thermal radiation signatures or patterns.

It is a further objective of the instant invention to provide a thermal target display system which can dynamically display the thermal radiation patterns emanating from changing scenes, and which can be interactively controlled by the operator to utilize sophisticated video image processing and enhancement techniques.

Still another objective of the instant invention is the provision of a system and method by which the thermal signature of virtually any real-scene object can be simulated in the field.

These as well as other objectives of the instant invention which will become apparent as the description proceeds, are implemented by the provision herein of a thermal target display screen composed of small, individually-controlled active thermal elements disposed in an array. The display screen is interfaced to and energized by a video system.

Specifically, means are provided by which a video-compatible output signal is generated, such output signal being representative of the thermal or infrared radiation image of a real-scene object. The video-compatible output signal is then digitized and may be enhanced to restore degraded image quality by a video signal-processor which serves to generate other signals to produce a plurality of pixel elements defining a particular video frame. A control means is provided which serves to selectively energize individual ones of the array of thermal radiating elements constituting the display screen, such energization being in response to the output signals from the video signal processor so that a simulated thermal radiation pattern which corresponds to the video frame is generated on the thermal display screen.

A plurality of video frames may be generated and stored, and the system may be advanced or sequenced such that the thermal display screen or target displays a plurality of different thermal radiation images or signatures.

The operator of the device can further enhance the thermal radiation image by utilizing conventional video enhancement techniques to, for example, adjust the gray scale contrast of the image. Conventional video storage devices such as video tape or disk recorders can be utilized to store the infrared signals of the real-scene object and thus provide the operator of the system with a broad repertoire of different possible display targets.

The system and method of the instant invention, in effect, serves to provide a thermal "canvas" upon which the operator thereof can "paint" whatever thermal signature or scene that is desired to thereby remove much of the presently existing subjectivity from the field testing of thermal night vision devices.

BRIEF DESCRIPTION OF THE DRAWINGS

The invention itself will be better understood and further features and advantages thereof will become apparent from the following detailed description of a preferred inventive embodiment, taken in conjunction with the accompanying drawings wherein:

FIG. 1 is a schematic illustration and block diagram of a thermal target display system constructed in accordance with the teachings of the instant invention; and FIG. 2 is a schematic illustration and block diagram of specific details of the thermal target display or array of FIG. 1, as well as the apparatus for providing selective energization thereof.

DESCRIPTION OF THE PREFERRED EMBODIMENT

With reference now to FIG. 1 of the drawings, a thermal target display system is shown by which the thermal radiation signature or pattern such as might emanate from a real-scene object indicated by reference numeral 10, for example, is simulated and displayed on a thermal target array or screen 12. Specifically, the real-scene object 10 (which might, for example, constitute a vehicle or person), may be scanned by an infrared video-compatible camera 14 of conventional construction. Alternatively, a so-called "hard copy" or picture of an infrared scene such as depicted by reference numeral 16, might be scanned by a commercial video camera 18. In either event, an output signal is obtained at 20 from the infrared video camera 14, or at 22 from the commercial video camera 18. Either output signal represents the thermal radiation image of a selected realscene object.

Either signal 20 or 22, can be selected by the operator of the system by switch 24, the output thereof being transmitted via another switch 26 to either a conventional video storage device 28 such as a tape recorder or disc by line 30, or by line 32 to one input of selection switch 34. The other input of selection switch 34 constitutes output 36 from the video storage device or means 28. Thus, line 38, carries a video-compatible output signal representing the thermal radiation image of object 10, or object 16, for example. By the use of the term "video-compatible" it is meant that such a signal conforms to the conventional transmission format as known in the television art. Obviously, in the event that such video signals had initially been stored in video storage device 28, the operator of the system would have no necessity to provide scanning cameras 14 or 18.

The video-compatible signal on line 38 is then passed to a video digitizer processor 40 of conventional construction, such as a Quantex DS-30, where the image information within the signal is digitized, enhanced, and stored. The output of video processor 40 appearing on line 42 constitutes a digital signal representative of the image "grayness", and coordinate location information corresponding to the plurality of pixel elements which define a video frame.

The thermal target array display or screen 12 will be seen to comprise a plurality of individually controllable active thermal radiating elements, such as is indicated at 44. While a specific and more detailed description of the construction of the thermal target array or screen will be given with reference to FIG. 2, it is to be understood that each of the thermal radiating elements 44 operate to generate thermal energy in response to a voltage differential impressed across the elements. The individual thermal radiating elements are, as indicated, disposed in an array such that the energization of selective ones of the radiating elements will serve to generate an image or thermal signature such as is indicated by the darkened elements as reference numeral 46.

A microprocessor/controller 48 serves, in conventional fashion, to select individual ones of the thermal radiating elements 44 which correspond to the coordinate locations of respective video pixel elements in the video processor 40, and to energize same to a temperature corresponding to the digitized image "grayness" of the pixel element so that the thermal radiation pattern indicated at 46 can be generated on the display screen. The displayed radiation pattern corresponds to the video frame processed by the video signal processor 40 which, in turn, corresponds to the thermal radiation emanating from the selected real-scene object such as at 10 or 16. In effect, then, and by virtue of the video processor 40 along with the microprocessor/controller 48, commands are sent to the individual elements 44 within the thermal target array 12, which commands correspond to the degree of shading or contrast of the real-scene object scanned by the cameras 14 or 18.

Furthermore, and by utilization of the keyboard control 50 provided with the microprocessor 48, the operator of the system can readily program display shading nuances, and correlate the temperature of the elements 44 to the video gray scale as digitized by the video processor 40 (or chroma in the event that color television is utilized). The correspondence between the video gray scale and element temperature can be programmed by correlating, for instance, video black with a low temperature limit and video white with a high temperature limit. It follows then, that all intermediate shades of gray are linearly transformed, or correlated, with corresponding intermediate temperatures. The thermal pattern can be dynamically altered by programming new upper and/or lower temperature limits into the microprocessor/controller 48. The system, as described, effectively constitutes an interactive graphics display in the thermal regime.

Reference is now made to FIG. 2 of the drawings, which illustrates in more detail the manner of energizing each of the thermal radiating elements 44 under control of the microprocessor 48 and video digitizer-/image processor 40.

For purposes of clarity, only two thermal elements 44 are shown, each such element 44 being disposed upon a substrate 52 of a thermally and electrically insulating material. Each thermal radiating element is composed of a layer of film 54 of a conductive resistive coating such as Energy Kote (a trademark of TVI Corporation, Kensington, Md.) or as disclosed, for example in U.S. Pat. Nos. 3,923,697 and 3,999,040. The conductive resistive coating 54 is uniformly deposited on the insulating substrate 52 between two conducting bus bars 56 and 58 across which a differential voltage is impressed to thereby cause current to flow through the resistive coating 54 heating same. The voltage differential can be that obtained from a source such as indicated at reference numeral 60 and 62. It should be noted that the amount of heat given off by the resistive coating 54 is related to the magnitude of the differential voltage and to the amount of time such voltage is impressed across the bus bars. The present invention in its preferred embodiment develops a desired temperature based upon the amount of time such voltage differential is applied. The connection to the bus bars 56 and 58 is made through a controllable switch 64.

Switch 64 may constitute any conventional semiconductor switch which, under control of input terminal 66, serves to turn the circuit on or off, thus impressing or removing the voltage across the thermal radiating element 44.

The manner in which the control signal at 66 is generated by the video processor 40 and the microprocessor/controller 48 so as to energize each individual thermal radiating element and generate a particular pattern will now be described. In this respect, and although the scope of the instant invention is not so restricted for purposes of ease of explanation standard video image representations and conventions will be utilized and it will be assumed that the output from each of the cameras 14 and 18, and that of the video digitizer/processor 40, constitute an EIA STD RS-170 525 line 2:1 interlaced video image. Each video or image frame in this instance would consist of 525 horizontal lines, each of which consists of 525 picture elements or pixels.

A complete RS-170 video frame is updated every 1/30th of a second. Consequently, it may be envisioned that the video frame is a spatial/temporal 525 by 525 matrix of which each pixel has a precise physical location which is time determinant, i.e. in a given video frame the Nth pixel will occur temporally at the $(N)/((30)(525)(525))$ fraction of a second into the frame scan. In the RS-170 video format the image information is an analog representation of the whiteness or blackness, i.e. grayness, of the image and background. Moreover, each pixel location of the image, as processed by the video digitizer/processor 40, is assigned a spatial digital memory location, i.e. a physical location. Because the whiteness/blackness of each pixel element coming from cameras 14 or 18 is an analog signal, i.e. a voltage level, it can be represented digitally by dividing the white-to-black range into 64, or 128, or 256 or more discrete levels represented by 6,7,8 or more digital bits. This representation is inserted into each pixel memory location within the video digitizer/processor 40 as described above. Thus, the digital representation of the real-scene image in video digitizer/processor 40 is stored in 525×525 memory locations, each of which may be 8 bits of digital data, with the address of each such memory location corresponding to a precise time in the scanning of each frame. The video digitizer/processor 40 further allows expanded capability through exercise of enhancement algorithims designed to make the object of interest more detectable.

In the instant invention, and presuming that a total number M of thermal radiating elements 44 are disposed in the array, then 525×525/M thermal radiating elements provides the number of pixels in the video digitizer/processor 40 which correspond to a thermal element 44. In the event of a one to one correspondence, i.e. the same number of thermal elements 44 as there are video pixel elements, the output from the video digitizer/processor 40 for a single video pixel element would be utilized to generate the reference or control signal to energize a single thermal radiating element. In the more typical case, however, a lesser number of thermal radiating elements 44 will be provided than there are video pixels per video frame. In this case, the average grayness of a block of pixels will be correlated to the temperature of a single thermal element in video digitizer/processor 40.

In any event, once the video image is digitized and processed within the video digitizer/processor 40, it is then output to the microprocessor/controller 48 for further processing and/or manipulation of the signals energizing the thermal radiating elements 44 of the thermal target array or screen 12. In this respect, the gray level of each pixel or pixel block stored within video digitizer/processor 40 is converted by the microprocessor/controller 48 into a digital reference signal 68. Signal 68 represents the thermal energy level of the respective thermal radiating element required to obtain the desired thermal contrast. This thermal energy level is correlated with the gray level of the pixel element, and is assigned a temperature value by the microprocessor/controller 48. The thermal radiating element is then heated to that temperature value.

Specifically, and with reference again to FIG. 2, each thermal radiating element will be seen to include a temperature sensing device, such as thermistor 70, which serves to generate a signal on line 72 representative of the actual temperature of the thermal element 44. The desired temperature of a thermal element 44 would be that which would be equivalent to the magnitude of reference signal 68. Analog to digital convertor 74 provides digital representations of the thermistor 70 output voltage. As long as reference signal 68 exceeds the actual temperature signal from converter 74, a switch 64 is closed thus impressing a voltage differential across the bus bars 56 and 58 of the thermal element 54. When the temperature of the thermal element rises to the required level, the signal from converter 74 equals the reference signal 68, thus turning switch 64 off, and removing the voltage differential across bus bars 56 and 58. Under control of the microprocessor/controller 48, the thermal radiating element will be cycled on and off so as to retain the necessary temperature. Each of the thermal radiating elements 44 in the array or screen 12 are controlled in similar fashion such that the screen 12 will radiate a thermal pattern which corresponds to the video image within the video digitizer/processor 40.

Means are further provided for adjusting the reference or control signal 68 in accordance with the ambient temperature in the proximity of each thermal radiating element 54. In this respect, the temperature ultimately obtained by a thermal radiating element 44, in response to a reference signal 68, may be either an absolute temperature or a precisely calculated differential temperature with respect to the background ambient, thermistor 76. Thus, and as an illustrative example, it is to be noted that a further thermistor 76 is provided in the proximity of a thermal element 44, the output signal of which is itself also converted in A/D converter 74 and processed and compared at 78 with the reference signal 68.

With the inventive system, and as already briefly described above, it is possible for the operator to utilize various signal enhancement techniques typical in the video art so as to change contrast and gray level, for example, as desired. In this respect, keyboard control 50 (FIG. 1) of microprocessor 48 would be utilized by the operator to set upper and lower contrast limits desired in the thermal display or target array 12, with the upper and lower temperature limits of each thermal radiating element corresponding for example to the white and black absolute values The microprocessor 48, from the upper and lower absolute limits, would then serve to calculate and generate the specific required temperature reference signal 68. Under control of the keyboard 50, the operator further could cause the display to sequence and advance, from one video frame to another, thus providing a dynamic interactive display limited only by the thermal response time of the thermal radiating elements constituting the screen 12.

It should now be apparent that the objectives set forth at the outset of this specification have been successfully achieved. Accordingly

What is claimed is:

1. A thermal target display system for generating simulated thermal radiation patterns of selected real-scene objects, said system comprising:
   means for providing a video-compatible output signal representative of the thermal radiation image of said object;
   video signal processor means for digitizing and enhancing said video compatible signal, said video signal processor means generating output signals for a plurality of pixel elements defining a video frame;

a thermal display screen having an array of individually controllable thermal radiating elements; and control means for selectively energizing individual ones of said array of thermal radiating elements in response to said output signals from said video signal processor means to generate a thermal radiation pattern on said display screen corresponding to said video frame, said control means including a converter for converting said output signals from said video processor means into respective temperature reference signals for said thermal radiating elements in said array, first temperature sensing means for sensing the temperature of each thermal radiating element to generate actual temperature signals corresponding respectively to the actual temperatures of said thermal radiating elements, and a comparator for comparing the temperature reference signal and the actual temperature signal for each thermal radiating element to provide an energizing output signal for each thermal radiating element until the actual temperature signal corresponds with the reference temperature signal.

2. A thermal target display system as defined in claim 1, further including second temperature sensing means associated with said thermal display screen for generating a correction signal representative of the ambient temperature in the proximity of said thermal radiating elements, said control means adjusting each reference temperature signal in response to said correction signal.

3. A thermal target display system as defined in claim 1, wherein said means for providing a video-compatible output signal representative of the thermal radiation image of an object includes a video-compatible thermal camera for scanning said object.

4. A thermal target display system as defined in claim 3, said system further including a video storage device for storing the output of said camera.

5. A thermal target display system as defined in claim 1, wherein said means for providing a video-compatible output signal representative of the thermal radiation image of an object further includes a video camera for scanning a prerecorded thermal radiation image of said object.

6. A thermal target display system as defined in claim 5, said system further including a video storage device for storing the output of said cameras.

7. A method of generating a radiation pattern on a thermal target of the type having a plurality of individually controllable thermal radiating elements disposed in an array such that said pattern simulates the thermal signature of a physical object, said method comprising the steps of:

generating a video-compatible signal representative of the thermal radiation of the object;

processing said video-compatible signal to convert same into digital signals representative of the pixel elements of a video frame;

converting said digital signals into respective temperature reference signals for the thermal radiating elements;

sensing the temperature of each thermal radiating element to generate actual temperature signals corresponding respectively to the actual temperatures of said thermal radiating elements; and comparing the temperature reference signal and the actual temperature signal for each thermal radiating element to provide an energizing output signal for each thermal radiating element until the actual temperature signal corresponds with the reference temperature signal, thus reproducing the thermal radiation image of the object.

8. The method as defined in claim 7, further including the step of sequencing the video frame so as to display a plurality of different thermal radiation images on the thermal target.

9. The method as defined in claim 7, further including the step of enhancing the digital signals representative of the pixel elements of the video frame to adjust the gray scale contrast thereof, and thereby modify the contrast of the thermal radiation image on the thermal target.

* * * * *